(12) United States Patent
Kasajima et al.

(10) Patent No.: US 6,801,377 B2
(45) Date of Patent: Oct. 5, 2004

(54) PERFORMANCE TEST METHOD OF HEAD GIMBAL ASSEMBLY WITH PRECISE POSITIONING ACTUATOR

(75) Inventors: Tamon Kasajima, Tokyo (JP); Katsuhiko Tomita, Tokyo (JP); Masashi Shiraishi, Tokyo (JP); Takashi Honda, Tokyo (JP); Takeshi Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 491 days.

(21) Appl. No.: 09/950,055

(22) Filed: Sep. 12, 2001

(65) Prior Publication Data

US 2002/0030912 A1 Mar. 14, 2002

(30) Foreign Application Priority Data

Sep. 13, 2000 (JP) .......................... 2000/277923

(51) Int. Cl.⁷ ............................................. G11B 27/36
(52) U.S. Cl. ....................................... 360/31; 360/77.02
(58) Field of Search ................................ 360/31, 77.02, 360/77.04, 77.06, 66, 57, 78.04; 324/210, 212

(56) References Cited

U.S. PATENT DOCUMENTS 5,745,319 A     4/1998   Takekado et al.
5,998,994 A  * 12/1999   Mori .......................... 324/212
6,590,388 B2 *  7/2003   Arnaout et al. ............. 324/210

FOREIGN PATENT DOCUMENTS

JP          08180623 A  *  7/1996   .............. 360/77.02

* cited by examiner

*Primary Examiner*—Alan T. Faber
(74) *Attorney, Agent, or Firm*—Armstrong, Kratz, Quintos, Hanson & Brooks, LLP

(57) ABSTRACT

A method of testing a performance of an HGA including a step of obtaining a displacement performance of a precise positioning actuator by driving this actuator to displace and by executing a track profile measurement of at least one thin-film magnetic head element.

34 Claims, 16 Drawing Sheets

RECORDED AREA
NON-RECORDED AREA

OFF-TRACK DISTANCE (DISPLACEMENT AMOUNT OF ACTUATOR)

RECORDED AREAS
NON-RECORDED AREA

TAA

0

OFF-TRACK DISTANCE (DISPLACEMENT AMOUNT OF ACTUATOR)

PEAK SHIFT AMOUNT    PEAK SHIFT AMOUNT
↑TAA

OFF-TRACK DISTANCE (DISPLACEMENT AMOUNT OF ACTUATOR)

S51: ONE TRACK OF INFORMATION IS WRITTEN WITH AC DRIVE DISPLACEMENT OF ACTUATOR

S52: TRACK PROFILE IS MEASURED WITH NO DISPLACEMENT OF ACTUATOR TO OBTAIN TAA PERFORMANCE

S53: DISPLACEMENT PERFORMANCE OF ACTUATOR IS OBTAINED FROM TAA PERFORMANCE

PERFORMANCE TEST METHOD OF HEAD GIMBAL ASSEMBLY WITH PRECISE POSITIONING ACTUATOR

BACKGROUND OF THE INVENTION

1. Field of the Invention

The present invention relates to a method of testing a performance of a head gimbal assembly (HGA) with a precise positioning actuator for a thin-film magnetic head element used in a magnetic disk drive unit and, more particularly, to a method of testing a displacement performance of the actuator.

2. Description of the Related Art

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) has rapidly increased to satisfy the requirement for ever increasing data storage capacities and densities in today magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be achieved by the VCM only. The techniques for achieving precise positioning of the magnetic head are described in for example U.S. Pat. No. 5,745,319 and Japanese patent publication No. 08180623 A.

As an example of such a precise positioning actuator, there is a piggy-back structure actuator using a piezoelectric material. This piggy-back structure actuator is formed by piezoelectric material member of PZT in an I-character shape with one end section to be fixed to a suspension, and the other end section to be fixed to a magnetic head slider and a pillar shaped movable arms connected between these end sections. By applying voltage across electrode layers sandwiching the piezoelectric material member, the actuator will displace to precisely position the thin-film magnetic head element.

In order to test a displacement performance of this precise positioning actuator, a displaced amount has been conventionally measured by using a laser Doppler vibration meter. Namely, when the actuator is driven, a laser beam is irradiated to the displaced section of the actuator and then the displaced amount is measured. By this test method of the displacement performance, a displaced amount and a response speed of the actuator in response to an applied drive signal can be accurately measured.

However, during manufacturing and testing processes of an HGA, such displacement measurement using a laser Doppler vibration meter will cause the following various problems:

(1) Because of the laser Doppler vibration meter itself is expensive, a manufacturing cost of the HGA increases;
(2) Because the measurement using the laser Doppler vibration meter requires a long time period, the inspection time becomes huge causing the manufacturing cost also to increase;
(3) Introduction of the laser Doppler vibration meter which is not included in the normal inspection instruments for testing the magnetic head element will complicate the inspection process and also increase the number of the inspection process; and
(4) Introduction of the laser Doppler vibration meter increases the footprint of the inspection instruments.

SUMMARY OF THE INVENTION

It is therefore an object of the present invention to provide a performance test method of an HGA with a precise positioning actuator, whereby a displacement performance of the actuator can be easily obtained in a short time without increasing a manufacturing cost of the HGA.

According to the present invention, a method of testing a performance of an HGA includes a step of obtaining a displacement performance of a precise positioning actuator by driving this actuator to displace and by executing a track profile measurement of at least one thin-film magnetic head element.

Because the displacement performance of the actuator is obtained by driving the actuator and by executing the track profile measurement which is one of the electromagnetic conversion performance measurements of the thin-film magnetic head element, it is not necessary to introduce a new inspection instrument resulting a manufacturing cost of the HGA to prevent from increasing. Also, because the displacement performance test can be executed simultaneously with the normal test of the electromagnetic conversion performance of the HGA using a dynamic performance (DP) tester or a read/write (R/W) tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

In this specification, riving an actuator to displace or riving an actuator for displacement is not equivalent to merely applying a drive signal to the actuator but means to control the drive signal of the actuator so that the actuator displaces from its initial position. Namely, depending upon a bias voltage applied to the actuator, the actuator may displace without applying a drive signal or the actuator may not locate at its initial position when a medium valued drive signal is applied thereto.

It is preferable that the driving of the actuator includes applying a DC drive signal or an AC drive signal to the actuator.

It is also preferable that the driving of the actuator is executed only during a reading out operation or a writing operation of the at least one thin-film magnetic head element.

According to the present invention, also, a method of testing a performance of an HGA provided with a magnetic head slider with at least one thin-film magnetic head element, a support and an actuator for displacing the magnetic head slider with respect to the support so as to precisely position the at least one thin-film magnetic head element, includes a step of writing at least one track of information on a magnetic medium with no displacement of the actuator, a step of executing a track profile measurement of the head gimbal assembly using the written at least one track of information with no displacement of the actuator to obtain a reference track average amplitude profile (reference TAA (track average amplitude) profile) with respect to an off-track distance, a step of measuring a TAA at each position displaced by driving the actuator, and a step of obtaining a displacement performance of the actuator from the reference TAA profile and the measured TAAs.

It is preferable that the driving of the actuator includes applying a DC drive signal to the actuator. In this case, the DC drive signal may be a DC voltage signal with a variable voltage, or DC voltage signals with voltages for driving the actuator to the maximum displacement thereof.

It is also preferable that the driving of the actuator is executed only during a reading out operation of the at least one thin-film magnetic head element.

It is preferable that the writing step includes a step of writing one track or two tracks on the magnetic medium. In the latter case, the written two tracks are preferably spaced by a distance substantially corresponding to the maximum displacement of the actuator from one side to the other side.

According to the present invention, furthermore, a method of testing a performance of an HGA provided with a magnetic head slider with at least one thin-film magnetic head element, a support and an actuator for displacing the magnetic head slider with respect to the support so as to precisely position the at least one thin-film magnetic head element, includes a step of writing at least one track of information on a magnetic medium with no displacement of the actuator, a step of executing a track profile measurement of the head gimbal assembly using the written at least one track of information with no displacement of the actuator to obtain a reference TAA profile with respect to an off-track distance, a step of executing a track profile measurement of the head gimbal assembly using the written at least one track of information with displacement of the actuator to obtain a TAA performance with respect to an off-track distance, and a step of obtaining a displacement performance of the actuator from the reference TAA profile and the TAA performance.

It is preferable that the executing step with displacement of the actuator includes executing a track profile measurement of the head gimbal assembly using the written at least one track of information when the actuator is driven to its maximum displacement to one side to obtain a first TAA performance with respect to an off-track distance, and executing a track profile measurement of the head gimbal assembly using the written at least one track of information when the actuator is driven to its maximum displacement to the other side to obtain a second TAA performance with respect to an off-track distance, and that the obtaining step includes obtaining a displacement performance of the actuator from the reference TAA profile and the first and second TAA performances.

It is preferable that the driving of the actuator includes applying a DC drive signal to the actuator. In this case, preferably the DC drive signal is DC voltage signals with voltages for driving the actuator to the maximum displacement thereof.

It is also preferable that the driving of the actuator is executed only during a reading out operation of the at least one thin-film magnetic head element.

It is preferable that the writing step includes a step of writing one track on the magnetic medium.

According to the present invention, a method of testing a performance of an HGA provided with a magnetic head slider with at least one thin-film magnetic head element, a support and an actuator for displacing the magnetic head slider with respect to the support so as to precisely position the at least one thin-film magnetic head element, includes, a step of writing at least one track of information on a magnetic medium with no displacement of the actuator, a step of executing a track profile measurement of the head gimbal assembly using the written at least one track of information with no displacement of the actuator to obtain a reference TAA profile with respect to an off-track distance, a step of deleting the written at least one track of information, a step of writing at least one track of information on a magnetic medium with displacement of the actuator, a step of executing a track profile measurement of the head gimbal assembly using the written at least one track of information with no displacement of the actuator to obtain a TAA performance with respect to an off-track distance, and a step of obtaining a displacement performance of the actuator from the reference TAA profile and the TAA performance.

Also according to the present invention, a method of testing a performance of an HGA provided with a magnetic head slider with at least one thin-film magnetic head element, a support and an actuator for displacing the magnetic head slider with respect to the support so as to precisely position the at least one thin-film magnetic head element, includes a step of writing at least one track of information on a magnetic-medium with no displacement of the actuator, a step of executing a track profile measurement of the head gimbal assembly using the written at least one track of information with no displacement of the actuator to obtain a reference TAA profile with respect to an off-track distance, a step of deleting the written at least one track of information, a step of writing at least one track of information on a magnetic medium with displacement for driving the actuator to its maximum displacement to one side, a step of executing a track profile measurement of the head gimbal assembly using the written at least one track of information with no displacement of the actuator to obtain a first TAA performance with respect to an off-track distance, a step of deleting the written at least one track of information, a step of writing at least one track of information on a magnetic medium with displacement for driving the actuator to its maximum displacement to the other side, a step of executing a track profile measurement of the head gimbal assembly using the written at least one track of information with no displacement of the actuator to obtain a second TAA performance with respect to an off-track distance, and a step of obtaining a displacement performance of the actuator from the reference TAA profile and the first and second TAA performances.

It is preferred that the driving of the actuator includes applying a DC drive signal to the actuator. In this case, preferably the DC drive signal is DC voltage signals with voltages for driving the actuator to the maximum displacement thereof.

It is also preferred that the driving of the actuator is executed only during a writing operation of the at least one thin-film magnetic head element.

It is preferred that the writing step includes a step of writing one track on the magnetic medium.

According to the present invention, furthermore, a method of testing a performance of an HGA provided with a magnetic head slider with at least one thin-film magnetic head element, a support and an actuator for displacing the magnetic head slider with respect to the support so as to precisely position the at least one thin-film magnetic head element, include a step of writing at least one track of information on a magnetic medium with no displacement of the actuator, a step of measuring a peak position of TAA from the at least one thin-film magnetic head element using the written at least one track of information with no displacement of the actuator, a step of deleting the written at least one track of information, a step of writing at least one track of information on a magnetic medium with displacement for driving the actuator to its maximum displacement to one side, a step of writing at least one track of information on a magnetic medium with displacement for driving the actuator to its maximum displacement to the other side, a step of executing a track profile measurement of the head gimbal assembly using the written tracks of information with no displacement of the actuator to obtain a TAA performance with respect to an off-track distance, and a step of obtaining a displacement performance of the actuator from the peak position and the TAA performance.

It is preferred that the driving of the actuator includes applying a DC drive signal to the actuator. In this case, preferably, the DC drive signal is DC voltage signals with voltages for driving the actuator to the maximum displacement thereof.

It is also preferred that the driving of the actuator is executed only during a writing operation of the at least one thin-film magnetic head element.

It is preferred that the writing step includes a step of writing one track or two tracks on the magnetic medium. In the latter case, preferably, the written two tracks are spaced by a distance substantially corresponding to the maximum displacement of the actuator from one side to the other side.

According to the present invention, also, a method of testing a performance of an HGA provided with a magnetic head slider with at least one thin-film magnetic head element, a support and an actuator for displacing the magnetic head slider with respect to the support so as to precisely position the at least one thin-film magnetic head element, includes a step of writing at least one track of information on a magnetic medium with AC drive displacement of the actuator, a step of executing a track profile measurement of the head gimbal assembly using the written at least one track of information with no displacement of the actuator to obtain a TAA performance with respect to an off-track distance, and a step of obtaining a displacement performance of the actuator from the TAA performance.

It is preferred that the driving of the actuator is executed only during a writing operation of the at least one thin-film magnetic head element.

It is also preferred that the writing step includes a step of writing one track on the magnetic medium.

It is further preferred that a frequency of the AC drive displacement of the actuator is variable.

Further objects and advantages of the present invention will be apparent from the following description of the preferred embodiments of the invention as illustrated in the accompanying drawings.

DESCRIPTION OF THE PREFERRED EMBODIMENTS

Figure 1:
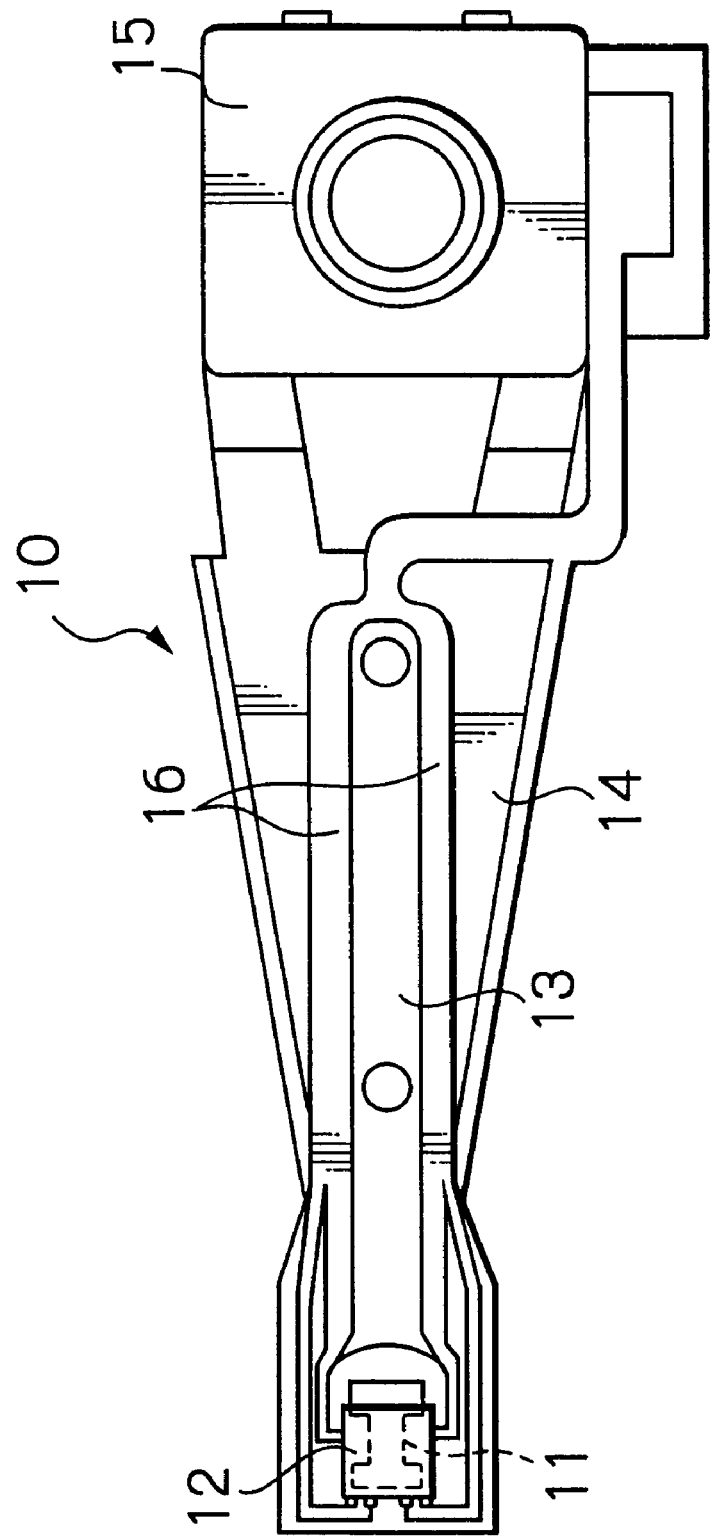
FIG. 1 shows a plane view illustrating the whole structure of an HGA used for a performance test according to the present invention.
Figure 2:
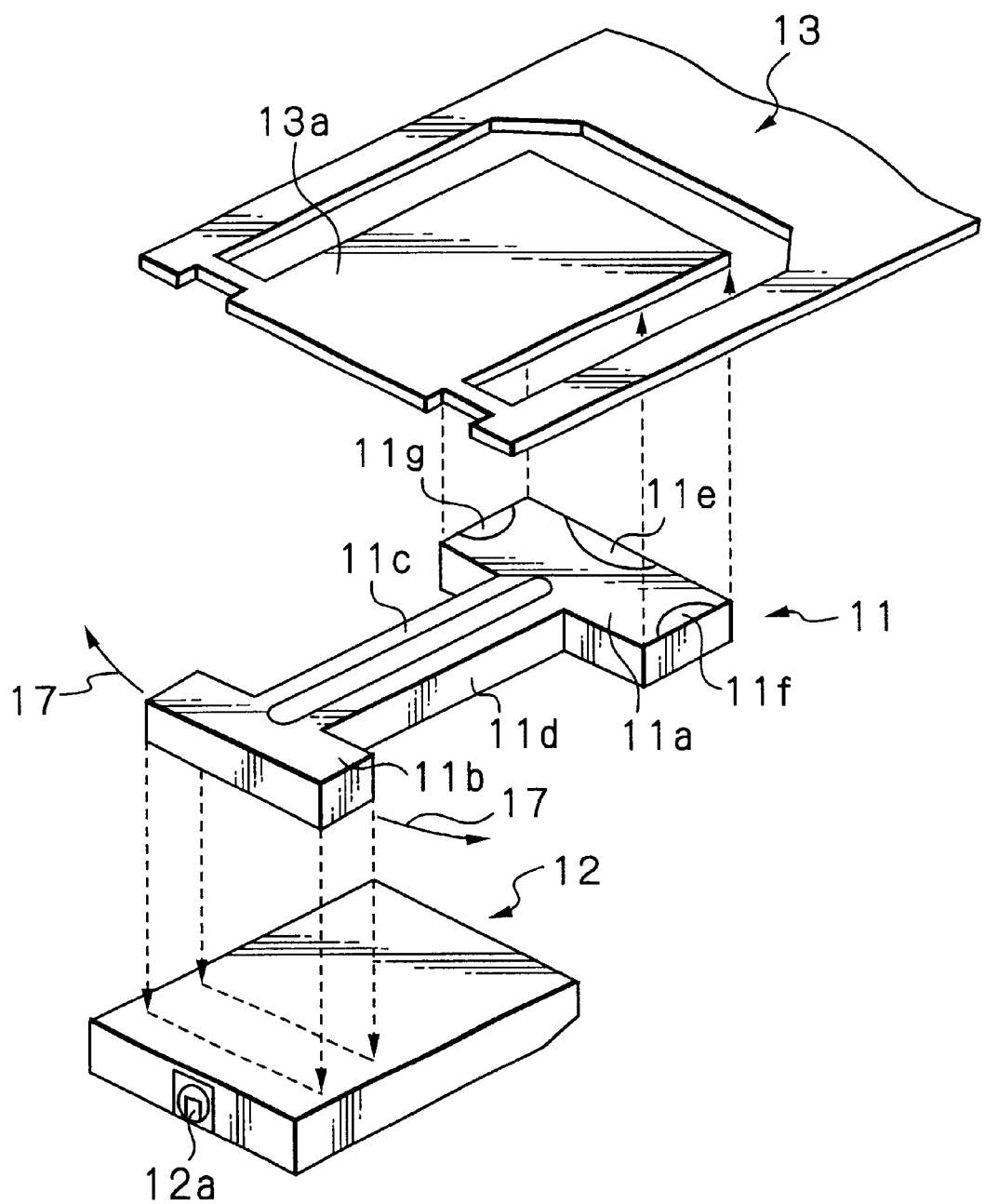
FIG. 2 shows an exploded oblique view illustrating a top end section of a flexure, an actuator and a magnetic head slider of the HGA shown in FIG. 1.

FIG. 1 illustrates the entire structure of an HGA used for a performance test according to the present invention, and FIG. 2 schematically illustrates an attachment structure of an actuator and a magnetic head slider with a top end section of a flexure of the HGA.

As shown in these figures, the HGA is assembled by fixing a fine tracking actuator 11 for precisely positioning of a thin-film magnetic head element to a top end section of a suspension 10. The actuator 11 holds a magnetic head slider 12 with the thin-film magnetic head element.

The suspension 10 is substantially configured by a resilient flexure 13 with a flexible tongue 13a formed at its top end section to carry the slider 12 through the actuator 11, a resilient load beam 14 fixed to the flexure 13, and a base plate 15 fixed to a rear end section of the load beam 14. On the flexure 13, a flexible conductor member 16 including a plurality of trace conductors of a thin-film multi-layered pattern is formed or disposed.

A main or course actuator of VCM is used for rotationally moving each drive arm to which such HGA is attached, so as to displace the whole assembly. The actuator 11 contributes the fine positioning of the HGA, which cannot be adjusted by the main or course actuator.

In this embodiment, the actuator 11 is a piggy-back structure actuator. As shown in FIG. 2, the piggy-back structure actuator 11 is formed in an I character shape by uniting a one end section 11a, the other end section 11b, and two rod shaped movable beams 11c and 11d for coupling the end sections 11a and 11b. Each of the beams 11c and 11d is formed by at least one piezoelectric or electrostrictive material layer sandwiched by electrode layers. By applying voltage across the electrode layers, the piezoelectric or electrostrictive material layer expands and contracts. The piezoelectric or electrostrictive material layer is made of material that expands and contracts by reverse piezoelectric effect or by electrostrictive effect. On the end section 11a, formed are a common electrode terminal 11e, an A channel signal electrode terminal 11f and a B channel signal electrode terminal 11g connected to the electrode layers.

One ends of the movable beams 11c and 11d are united with the end section 11a and this section 11a is fixed to the flexure 13. The other ends of the movable beams 11c and 11d are united with the end section 11b and this section 11b is fixed to the slider 12. Thus, bending motion of the movable beams 11c and 11d due to their expanding and contracting generates the displacement of the section 11b shown by arrows 17 in the figure and therefore the displacement of the slider 12. This displacement of the slider 12 results in the swing of the magnetic head element 12a along an arc so as to cross recording tracks of the magnetic disk surface.

Although the laser Doppler vibration meter has been used conventionally, according to the present invention, a displacement performance of an HGA with such actuator can be easily obtained by using a track profile measurement function provided in a DP tester or a R/W tester that is usually utilized to test the electromagnetic conversion performance of the HGA. Hereinafter, displacement performance testing methods according to the present inventions will be described in detail.

It should be noted that an HGA to be tested may have a precise positioning actuator with a different structure from the aforementioned piggy-back structure.

Figure 3:
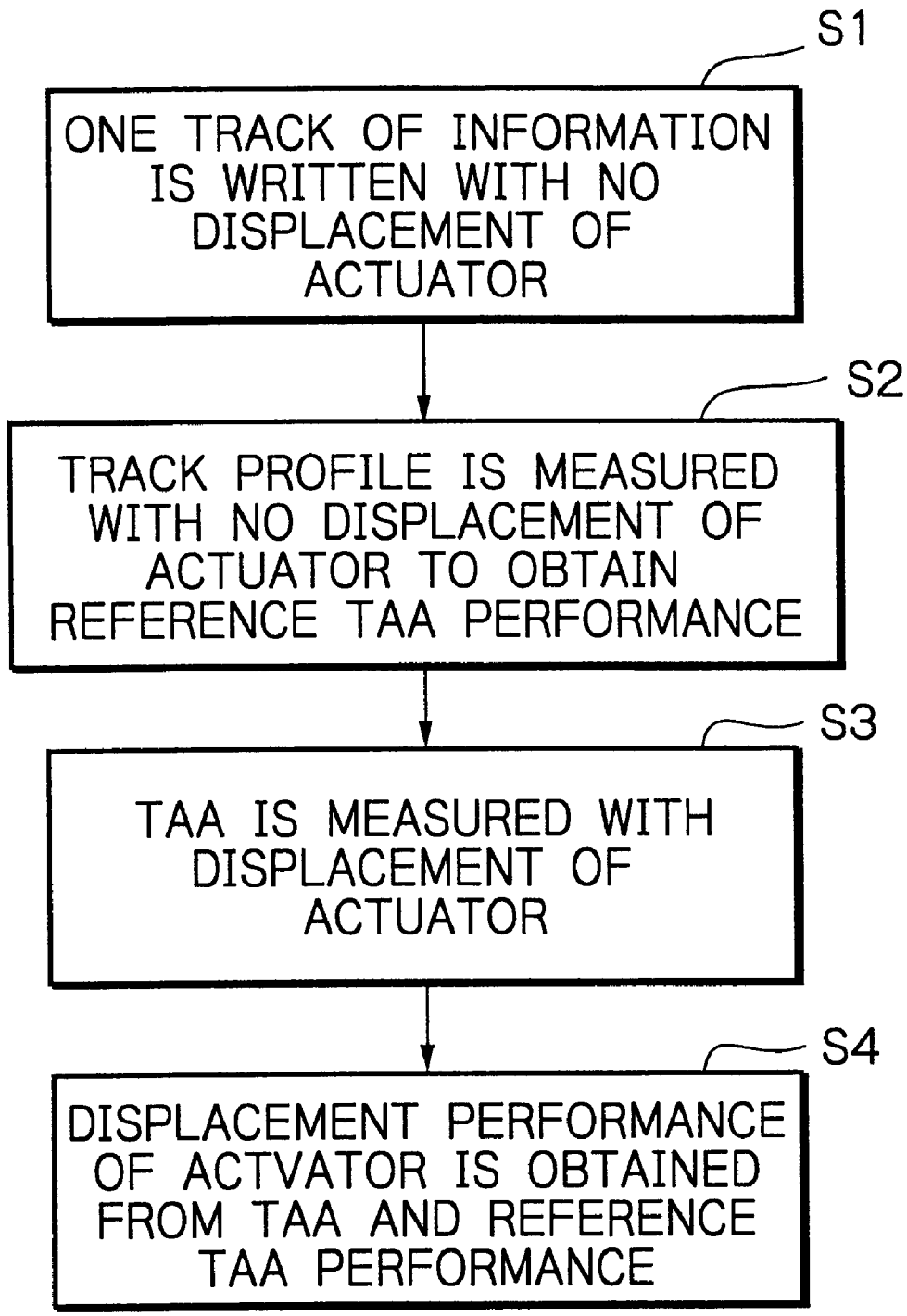
FIG. 3 shows a flow chart of an HGA performance test process in a preferred embodiment according to the present invention.

FIG. 3 is a flow chart of an HGA performance test process in a preferred embodiment according to the present invention.

Figure 4:
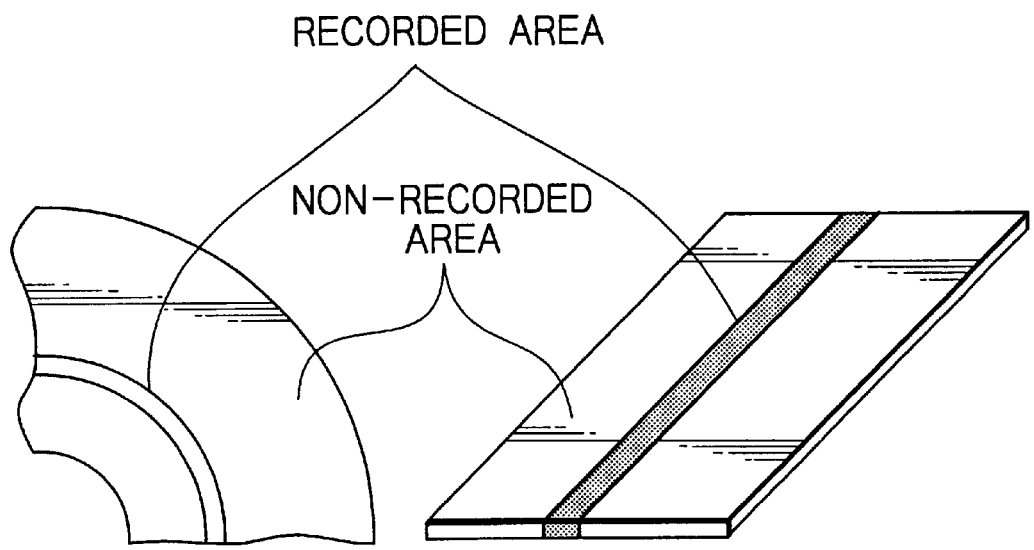
FIG. 4 illustrates a track written on a magnetic disk in the embodiment of FIG. 3.

First, an HGA to be tested is mounted on a R/W tester, and then one track of information is written on a magnetic disk without driving the actuator for displacement (step S1). More concretely, one track writing is executed while a drive signal of DC 7.5 V (bias) is applied to the A and B channel signal electrode terminals of the actuator to locate the actuator at the center that is its initial position. FIG. 4 indicates the thus written track on the magnetic disk.

Then, a track profile of this HGA using this written track is measured by the R/W tester also without driving the actuator for displacement (step S2).

Figure 5:
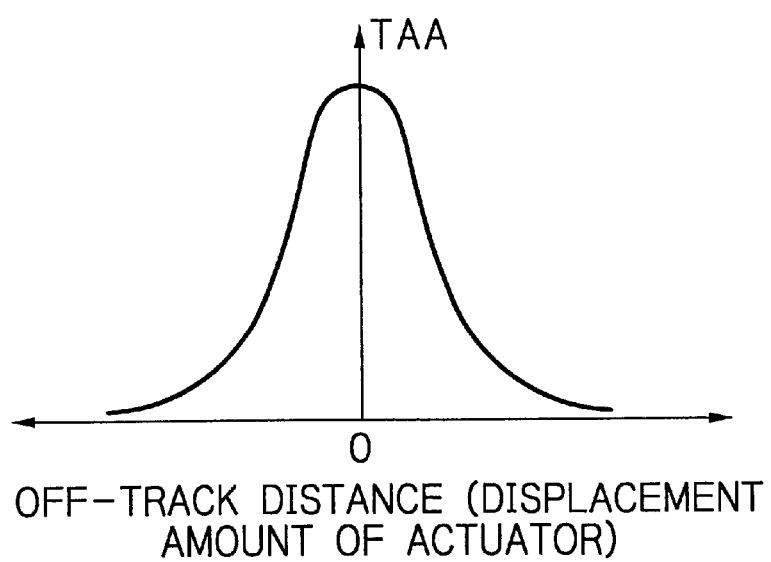
FIG. 5 illustrates a reference TAA performance obtained by a track profile measurement in the embodiment of FIG. 3.

In general, the R/W tester has a track profile measurement function for measuring, by gradually shifting the HGA mounted on the R/W tester along a radiating direction of the magnetic disk, a track average amplitude (TAA) of read-out signals from the thin-film magnetic head element at different positions. Thus, by executing the track profile measurement, a TAA performance with respect to a off-track distance or a distance from the track center, shown in FIG. 5 can be obtained.

The TAA performance with respect to the off-track distance obtained by the track profile measurement at step S2 is stored as a reference TAA performance or a reference TAA profile.

Then, the actuator is driven to displace and at each displaced position a TAA value is measured by using the R/W tester (step S3). More specifically, an optional DC drive voltage from DC 0 V (corresponding to the one side maximum displacement) to DC 15 V (corresponding to the other side maximum displacement) except for DC 7.5 V is applied to the signal electrodes of the actuator to displace the actuator to a position corresponding to the applied drive voltage from the initial position and TAA is measured at that state. TAA values when various drive voltages are applied are measured by using the R/W tester, respectively. For example, by changing step-by-step the drive voltage from DC 0 V to DC 15 V, the TAA value at each stage is measured. Thus, characteristics of TAA values versus drive voltages are obtained.

It should be noted that voltages having the same absolute difference value with respect to DC 7.5 V but having the opposite signs with each other are applied to the A and B channel signal electrode terminals of the actuator, respectively.

Then, an off-track distance or a displacement amount of the actuator corresponding to each of the measured TAA values is calculated from the stored reference TAA performance. Thus, the displacement amount of the actuator with respect to the drive voltage applied to the actuator can be obtained (step S4). Namely, displacement performance of the actuator such as characteristics of displacement amount (stroke) versus drive voltage, and characteristics of the maximum displacement amount versus drive voltage can be obtained.

As aforementioned, because the displacement performance of the actuator is obtained by utilizing the track profile measurement function of the R/W tester, it is not necessary to introduce a new inspection instrument resulting a manufacturing cost of the HGA to prevent from increasing. Also, because the displacement performance test can be executed simultaneously with the normal test of the electromagnetic conversion performance of the HGA using the R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

Figure 6:
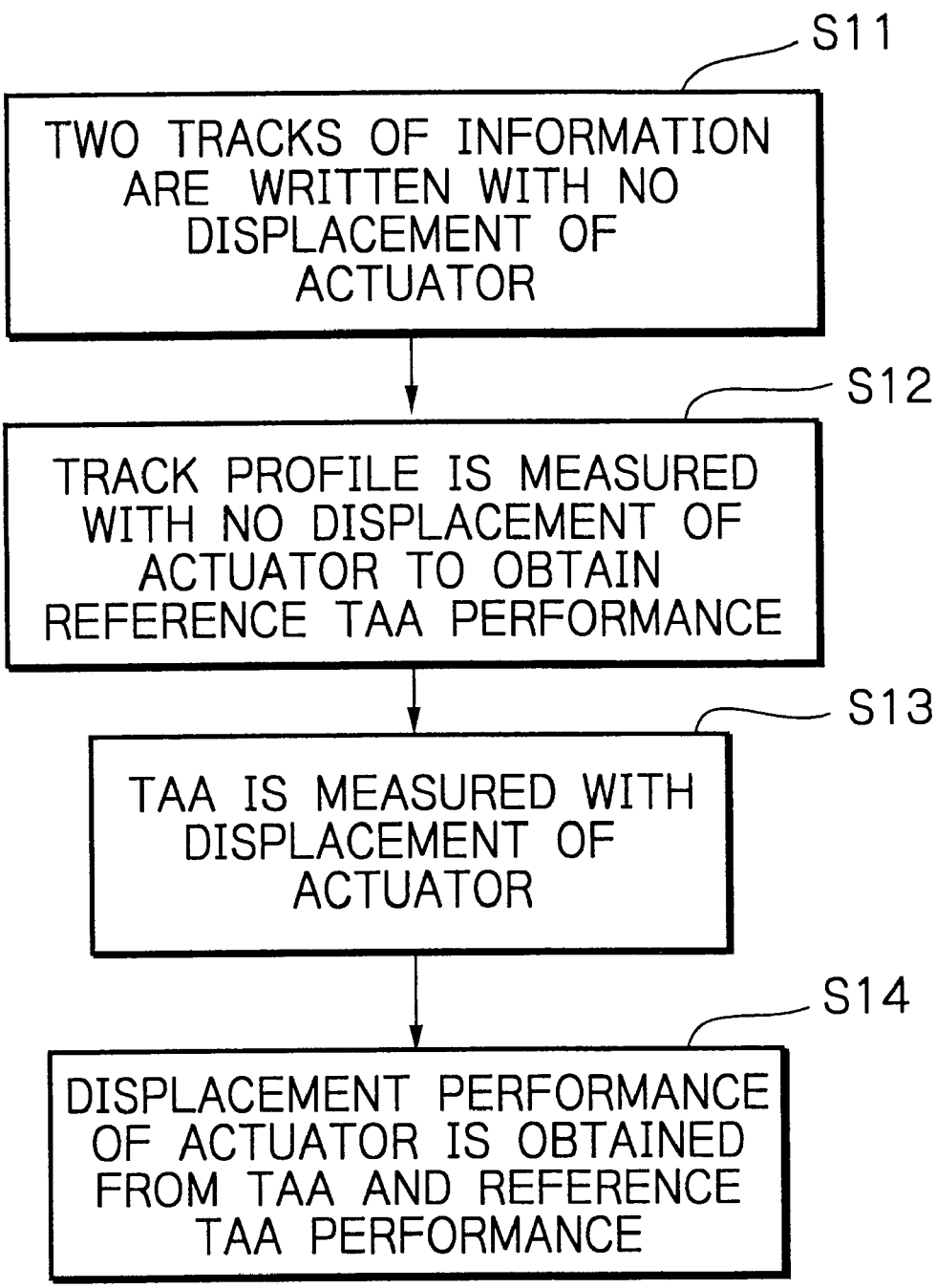
FIG. 6 shows a flow chart of an HGA performance test process in another embodiment according to the present invention.

FIG. 6 is a flow chart of an HGA performance test process in another embodiment according to the present invention.

Figure 7:
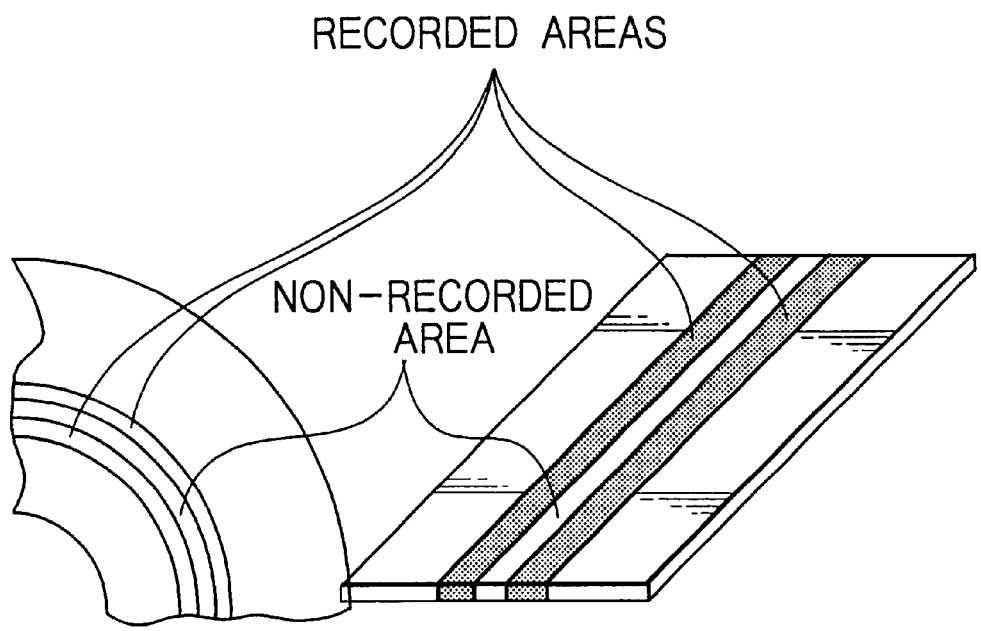
FIG. 7 illustrates tracks written on a magnetic disk in the embodiment of FIG. 6.

First, an HGA to be tested is mounted on a R/W tester, and then two tracks of information are written on a magnetic disk without driving the actuator for displacement (step S11). More concretely, two tracks writing is executed while a drive signal of DC 7.5 V (bias) is applied to the A and B channel signal electrode terminals of the actuator to locate the actuator at the center that is its initial position. A space between the two tracks is determined to a distance substantially corresponding to the maximum displacement of the actuator from one side to the other side. FIG. 7 indicates thus written two tracks on the magnetic disk.

Then, a track profile of this HGA using the written tracks is measured by the R/W tester also without driving the actuator for displacement (step S12). Thus, a TAA performance with respect to a off-track distance or a distance from the track center, shown in FIG. 8 can be obtained.

The TAA performance with respect to the off-track distance obtained by the track profile measurement at step S12 is stored as a reference TAA performance.

Then, the actuator is driven to displace and, at each displaced position, a TAA value is measured by using the RIW tester (step S13). More concretely, an optional DC drive voltage from DC 0 V (corresponding to the one side maximum displacement) to DC 15 V (corresponding to the other side maximum displacement) except for DC 7.5 V is applied to the signal electrodes of the actuator to displace the actuator to a position corresponding to the applied drive voltage from the initial position and TAA is measured at that state. TAA values when various drive voltages are applied are measured by using the R/W tester, respectively. For example, by changing step-by-step the drive voltage from DC 0 V to DC 15 V, the TAA value at each stage is measured. Thus, characteristics of TAA values versus drive voltages are obtained.

It should be noted that voltages having the same absolute difference value with respect to DC 7.5 V but having the opposite signs with each other are applied to the A and B channel signal electrode terminals of the actuator, respectively.

Then, an off-track distance or a displacement amount of the actuator corresponding to each of the measured TAA values is calculated from the stored reference TAA performance. Thus, the displacement amount of the actuator with respect to the drive voltage applied to the actuator can be obtained (step S14). Namely, displacement performance of the actuator such as characteristics of displacement amount (stroke) versus drive voltage, and characteristics of the maximum displacement amount versus drive voltage can be obtained.

As aforementioned, because the displacement performance of the actuator is obtained by utilizing the track profile measurement function of the R/W tester, it is not necessary to introduce a new inspection instrument resulting a manufacturing cost of the HGA to prevent from increasing. Also, because the displacement performance test can be executed simultaneously with the normal test of the electromagnetic conversion performance of the HGA using the R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

Figure 8:
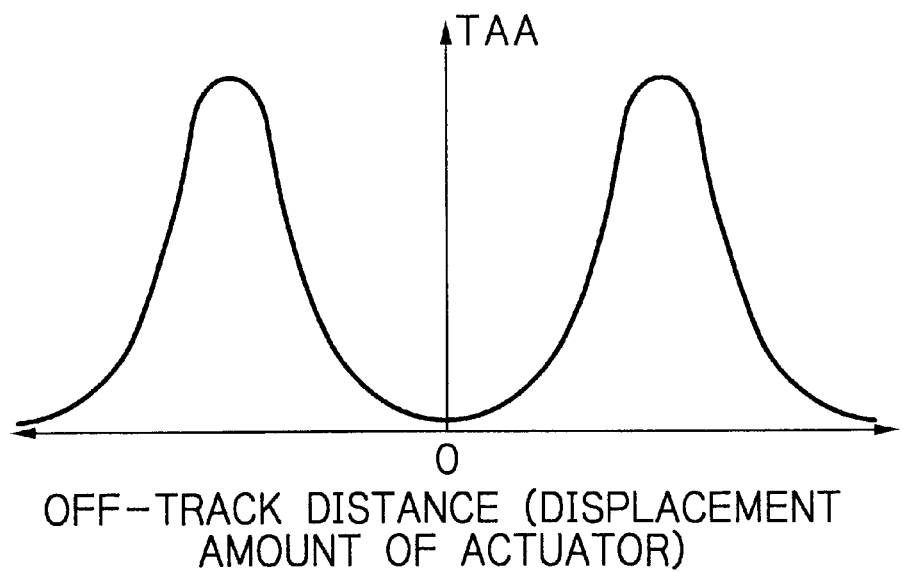
FIG. 8 illustrates a reference TAA performance obtained by a track profile measurement in the embodiment of FIG. 6.

Particularly, according to this embodiment, the displacement amount of the actuator is measured based upon read-out signals from the two tracks spaced with each other by a distance substantially corresponding to the maximum displacement of the actuator from one side to the other side. Thus, as shown in FIG. 8, the reference TAA performance will not be degraded at the large off-track distance range or the large displacement amount range. Therefore, calculation of the displacement amount becomes easy and more precise calculation of the displacement amount is possible.

Figure 9:
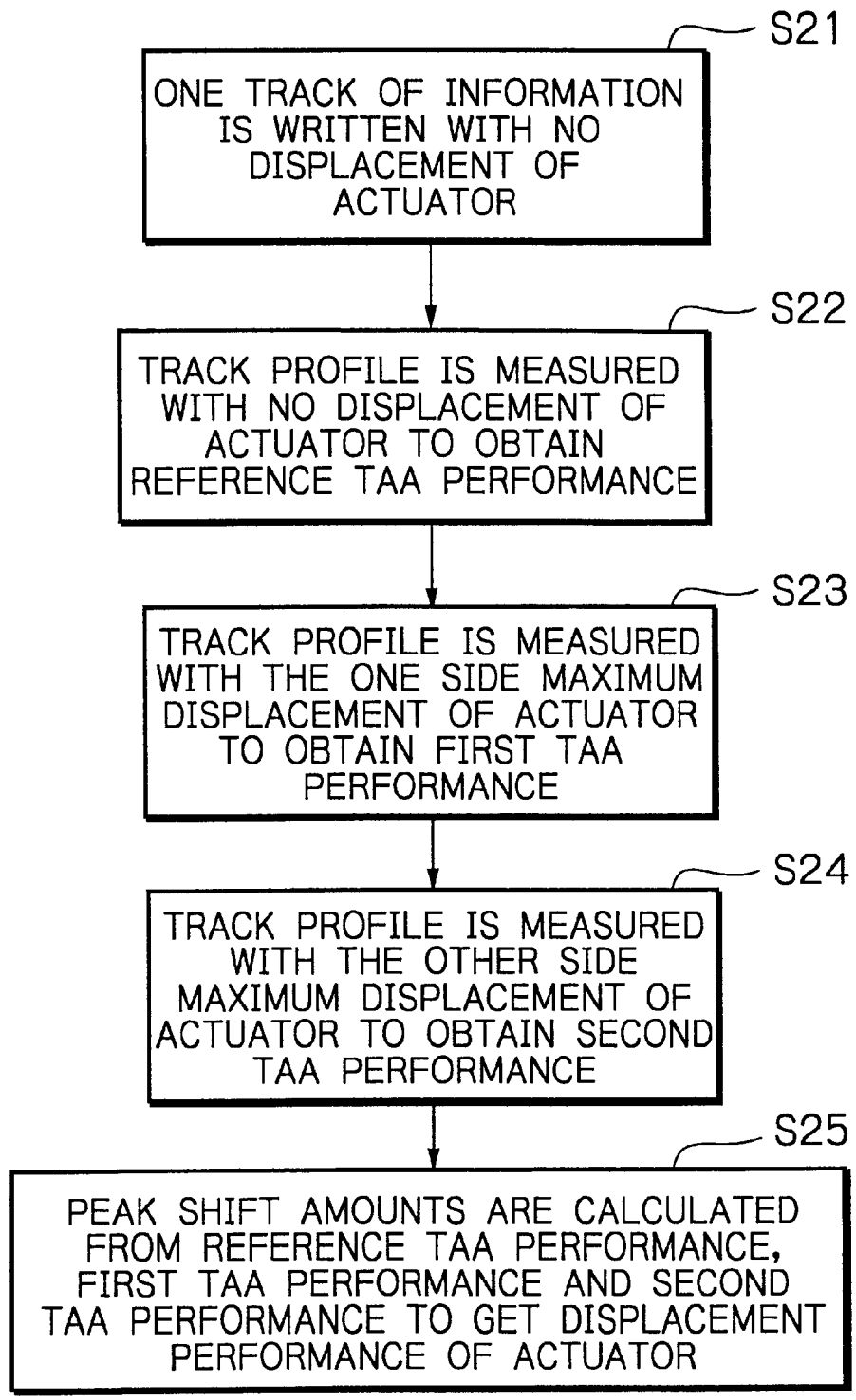
FIG. 9 shows a flow chart of an HGA performance test process in a further embodiment according to the present invention.

FIG. 9 is a flow chart of an HGA performance test process in a further embodiment according to the present invention.

Figure 10:
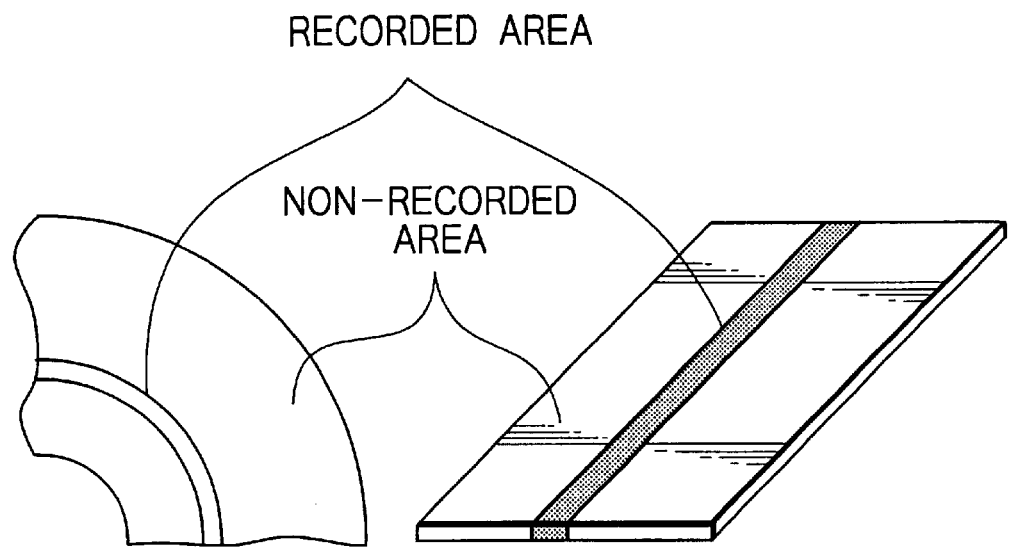
FIG. 10 illustrates a track written on a magnetic disk in the embodiment of FIG. 9.

First, an HGA to be tested is mounted on a R/W tester, and then one track of information is written on a magnetic disk without driving the actuator for displacement (step S21). More concretely, one track writing is executed while a drive signal of DC 7.5 V (bias) is applied to the A and B channel signal electrode terminals of the actuator to locate the actuator at the center that is its initial position. FIG. 10 indicates thus written track on the magnetic disk.

Figure 11:
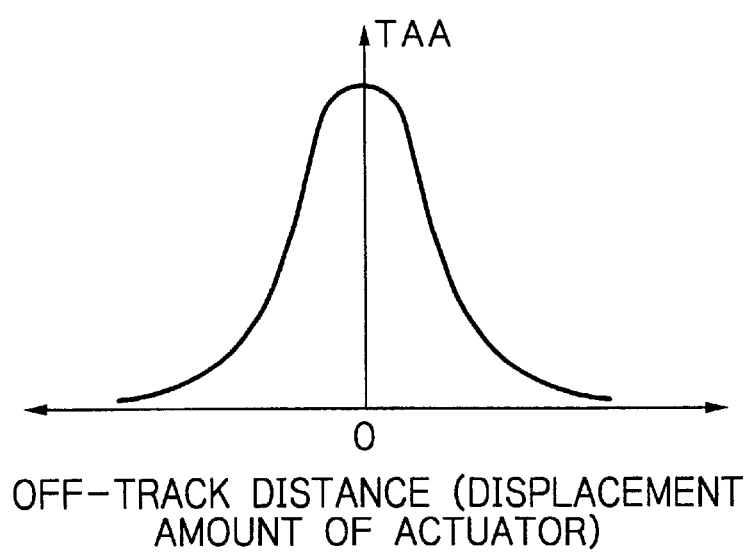
FIG. 11 illustrates a reference TAA performance obtained by a track profile measurement in the embodiment of FIG. 9.

Then, a track profile of this HGA using the written track is measured by the R/W tester also without driving the actuator for displacement (step S22). Thus, a TAA performance with respect to a off-track distance or a distance from the track center, shown in FIG. 11 can be obtained.

The TAA performance with respect to the off-track distance obtained by the track profile measurement at step S22 is stored as a reference TAA performance.

Then, the actuator is driven to the one side maximum displacement and, at this displaced position, TAA values are measured by using the track profile measurement function of the R/W tester (step S23). More specifically, the drive voltage of DC 15 V is applied to the A channel signal electrode terminal and also the drive voltage of DC 0 V is applied to the B channel signal electrode terminal so as to displace the actuator to the one side maximum displaced position, and TAA values are measured at that state. Thus, a TAA performance with respect to a off-track distance or a distance from the track center, shown in FIG. 12, can be obtained.

The TAA performance with respect to the off-track distance obtained by the track profile measurement at step S23 is stored as a first TAA performance.

Then, the actuator is driven to the other side maximum displacement and, at this displaced position, TAA values are measured by using the track profile measurement function of the R/W tester (step S24). More concretely, the drive voltage of DC 0 V is applied to the A channel signal electrode terminal and also the drive voltage of DC 15 V is applied to the B channel signal electrode terminal so as to displace the actuator to the other side maximum displaced position, and TAA values are measured at that state. Thus, a TAA performance with respect to a off-track distance or a distance from the track center, shown in FIG. 13, can be obtained.

The TAA performance with respect to the off-track distance obtained by the track profile measurement at step S24 is stored as a second TAA performance.

Figure 12:
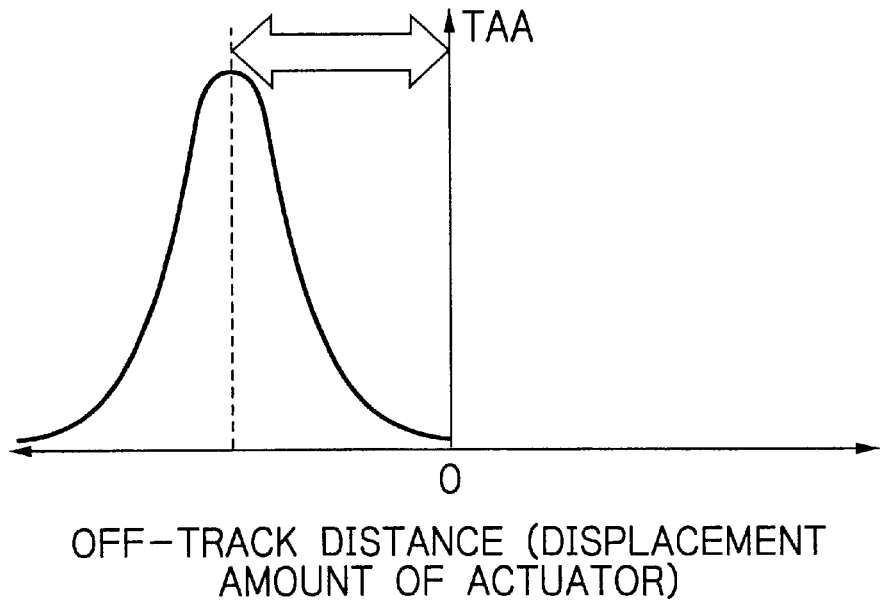
FIG. 12 illustrates a first TAA performance obtained by a track profile measurement in the embodiment of FIG. 9.
Figure 13:
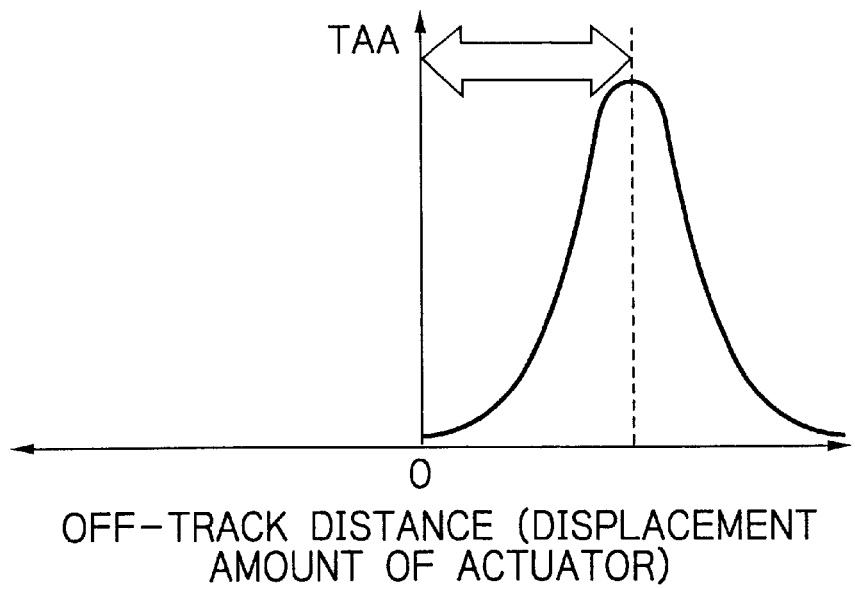
FIG. 13 illustrates a second TAA performance obtained by a track profile measurement in the embodiment of FIG. 9.

Thereafter, by comparing thus obtained first and second TAA performances with the stored reference TAA performance, peak shift amounts shown in FIGS. 12 and 13 are calculated to get the one side maximum displacement and the other side maximum displacement of the actuator (step S25). As a result, displacement performance of the actuator such as characteristics of the maximum displacement amount versus drive voltage can be obtained.

As aforementioned, because the displacement performance of the actuator is obtained by utilizing the track profile measurement function of the R/W tester, it is not necessary to introduce a new inspection instrument resulting a manufacturing cost of the HGA to prevent from increasing. Also, because the displacement performance test can be executed simultaneously with the normal test of the electromagnetic conversion performance of the HGA using the R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

Figure 14:
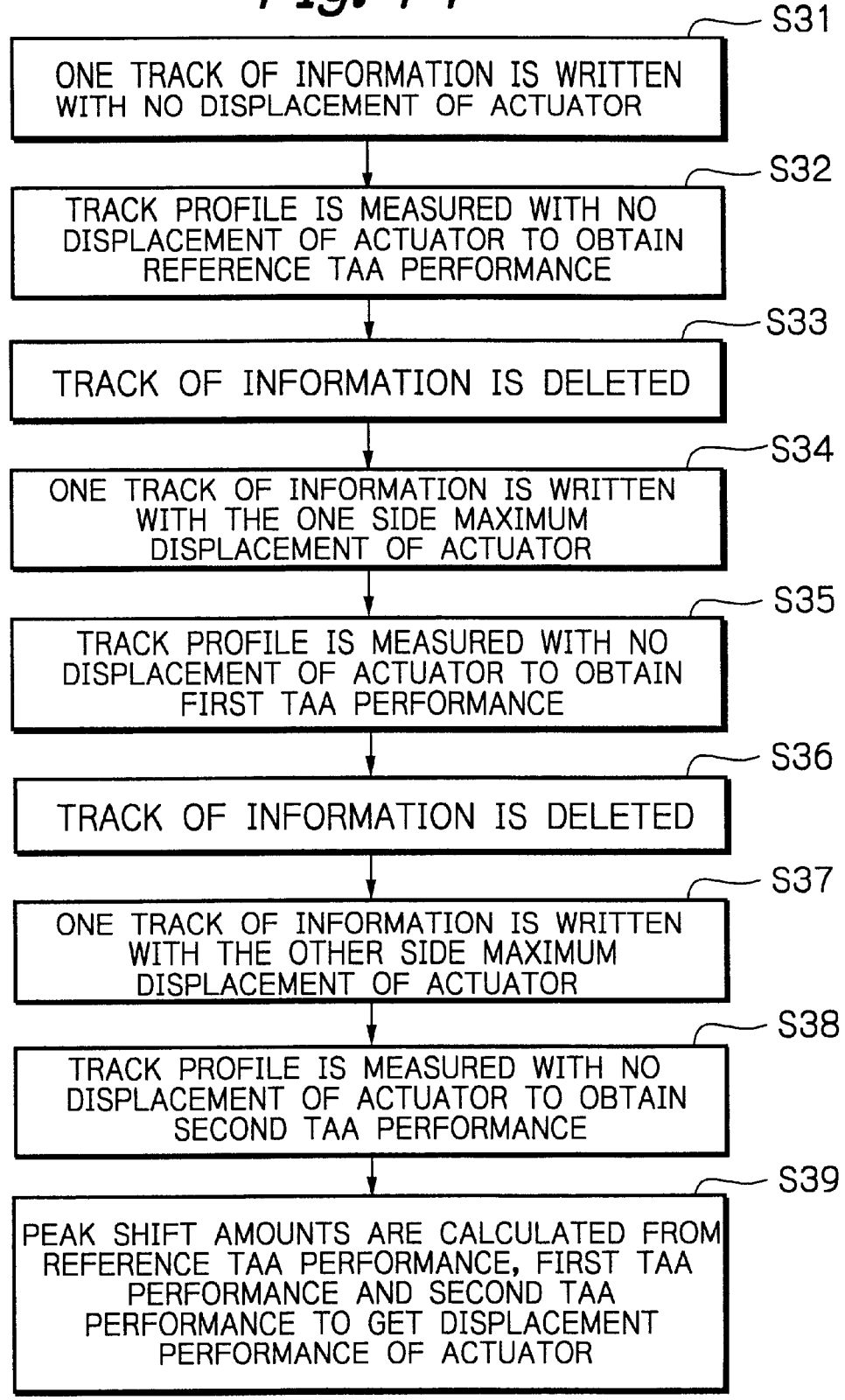
FIG. 14 shows a flow chart of an HGA performance test process in a still further embodiment according to the present invention.

FIG. 14 is a flow chart of an HGA performance test process in a still further embodiment according to the present invention.

First, an HGA to be tested is mounted on a R/W tester, and then one track of information is written on a magnetic disk without driving the actuator for displacement (step S31). More concretely, one track writing is executed while a drive signal of DC 7.5 V (bias) is applied to the A and B channel signal electrode terminals of the actuator to locate the actuator at the center that is its initial position.

Then, a track profile of this HGA using the written track is measured by the R/W tester also without driving the actuator for displacement (step S32). Thus, a TAA performance with respect to a off-track distance or a distance from the track center, indicated by Prof.1 in FIG. 15 can be obtained.

The TAA performance with respect to the off-track distance obtained by the track profile measurement at step S32 is stored as a reference TAA performance.

Then, one track of information written on the magnetic disk is deleted (step S33).

Then, the actuator is driven to the one side maximum displacement and at this displaced position one track of information is written on the magnetic disk (step S34). More specifically, the drive voltage of DC 15 V is applied to the A channel signal electrode terminal and also the drive voltage of DC 0 V is applied to the B channel signal electrode terminal so as to displace the actuator to the one side maximum displaced position, and one track writing is executed at that state.

Thereafter, a track profile of the HGA using this written track is measured by the R/W tester without driving the actuator for displacement (step S35). Thus, a TAA performance with respect to a off-track distance or a distance from the track center, indicated by Prof.2 in FIG. 15 can be obtained.

The TAA performance with respect to the off-track distance obtained by the track profile measurement at step S35 is stored as a first TAA performance.

Then, the one track of information written on the magnetic disk is deleted (step S36).

Then, the actuator is driven to the other side maximum displacement and at this displaced position one track of information is written on the magnetic disk (step S37). More concretely, the drive voltage of DC 0 V is applied to the A channel signal electrode terminal and also the drive voltage of DC 15 V is applied to the B channel signal electrode terminal so as to displace the actuator to the other side maximum displaced position, and one track writing is executed at that state.

Thereafter, a track profile of the HGA using this written track is measured by the R/W tester without driving the actuator for displacement (step S38). Thus, a TAA performance with respect to a off-track distance or a distance from the track center, indicated by Prof.3 in FIG. 15 can be obtained.

The TAA performance with respect to the off-track distance obtained by the track profile measurement at step S38 is stored as a second TAA performance.

Figure 15:
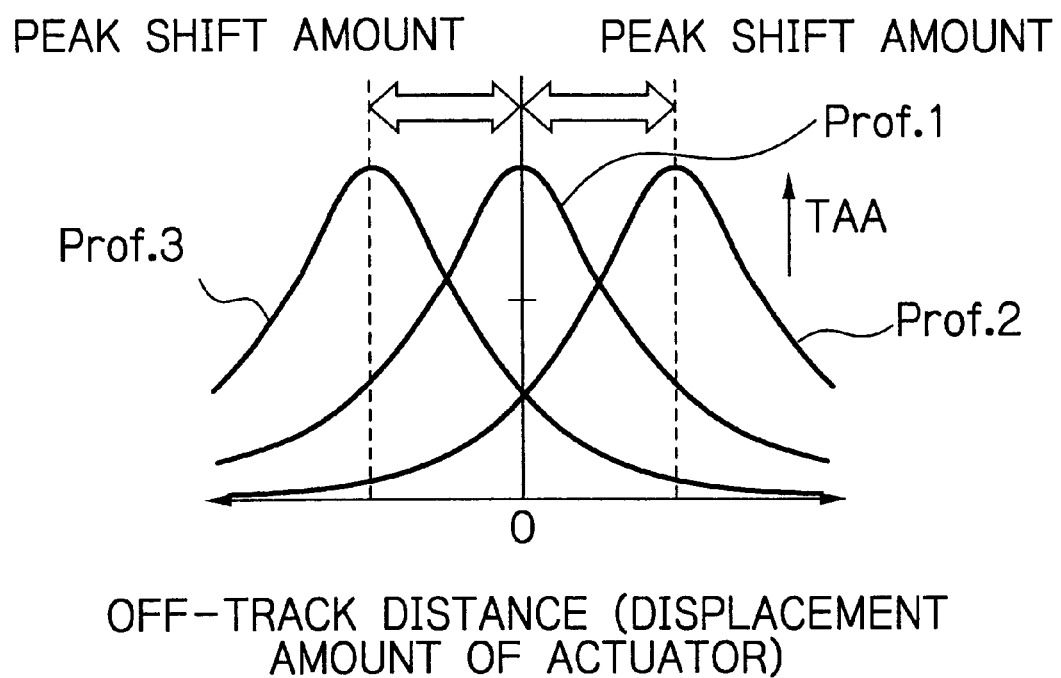
FIG. 15 illustrates a TAA performance obtained by a track profile measurement in the embodiment of FIG. 14.

Thereafter, by comparing thus obtained first and second TAA performances with the stored reference TAA performance, peak shift amounts shown in FIG. 15 are calculated to get the one side maximum displacement and the other side maximum displacement of the actuator (step S39). As a result, displacement performance of the actuator such as characteristics of the maximum displacement amount versus drive voltage can be obtained.

As aforementioned, because the displacement performance of the actuator is obtained by utilizing the track profile measurement function of the R/W tester, it is not necessary to introduce a new inspection instrument resulting a manufacturing cost of the HGA to prevent from increasing. Also, because the displacement performance test can be executed simultaneously with the normal test of the electromagnetic conversion performance of the HGA using the R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

Figure 16:
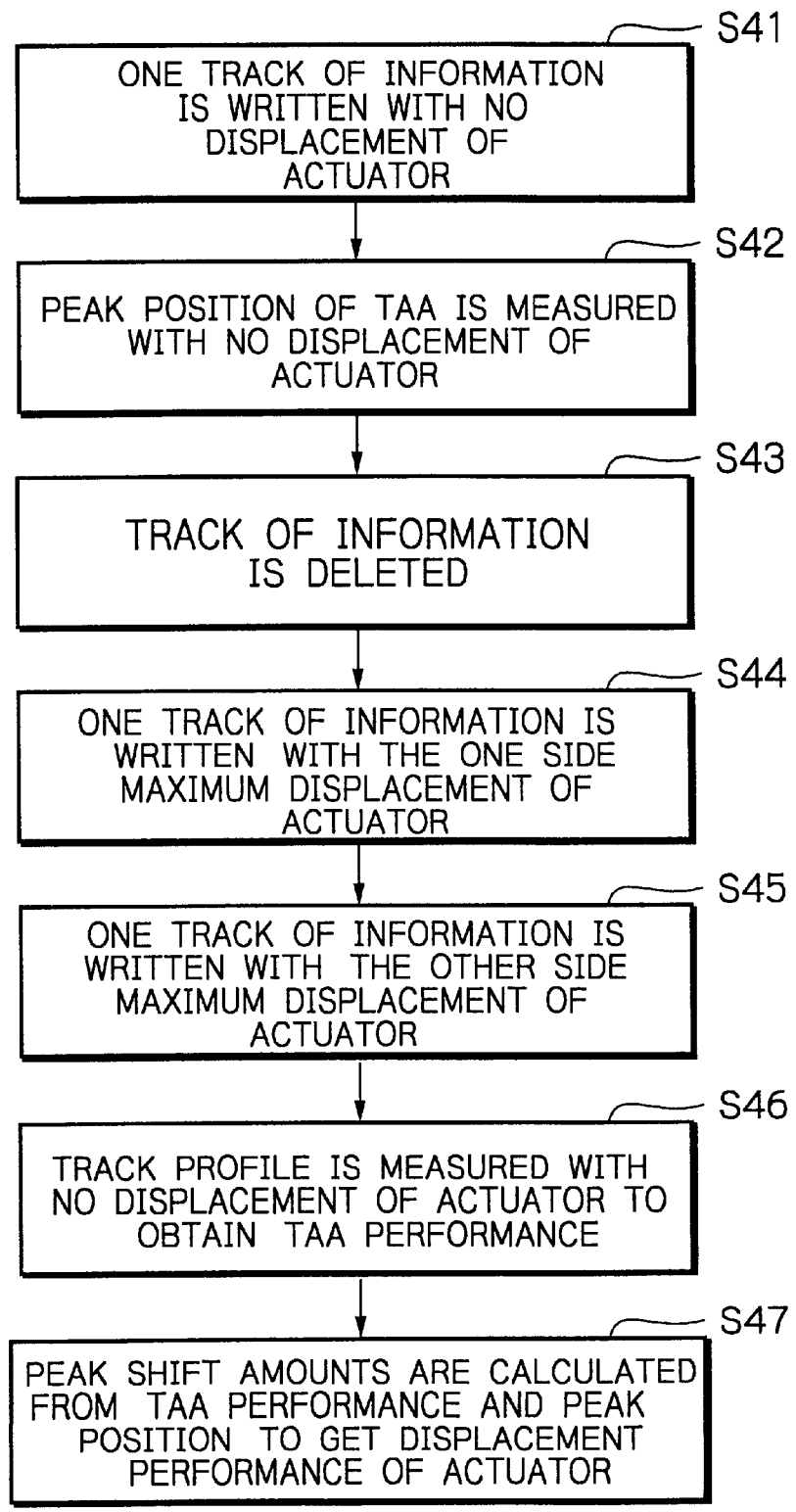
FIG. 16 shows a flow chart of an HGA performance test process in a still more further embodiment according to the present invention.

FIG. 16 is a flow chart of an HGA performance test process in a still further embodiment according to the present invention.

First, an HGA to be tested is mounted on a R/W tester, and then one track of information is written on a magnetic disk without driving the actuator for displacement (step S41). More concretely, one track writing is executed while a drive signal of DC 7.5 V (bias) is applied to the A and B channel signal electrode terminals of the actuator to locate the actuator at the center that is its initial position.

Figure 17:
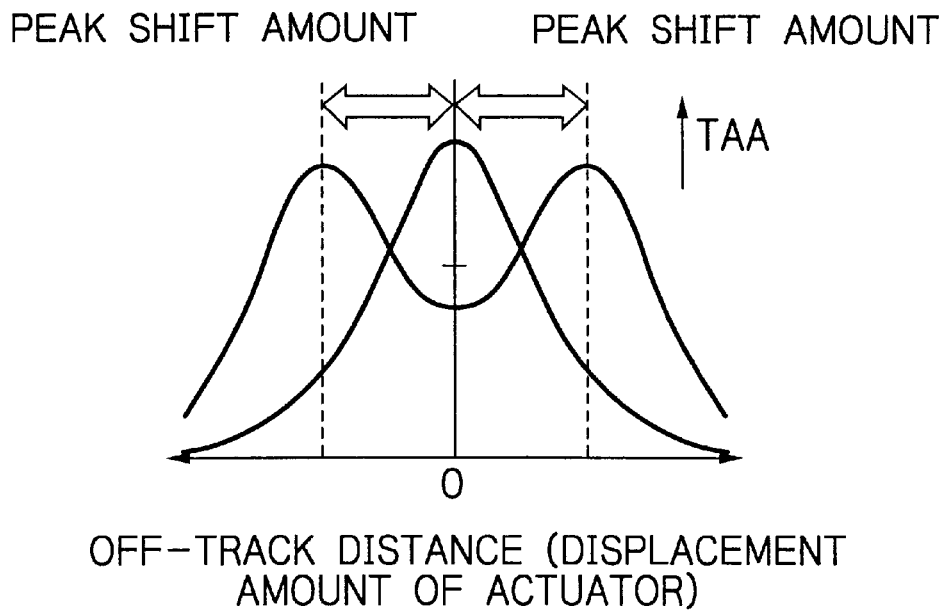
FIG. 17 illustrates a TAA performance obtained by a track profile measurement in the embodiment of FIG. 16.

Then, a peak position of TAA of this HGA using the written track is measured by the R/W tester without driving the actuator for displacement (step S42). Thus, a position of zero off-track distance or the track center, as shown in FIG. 17, can be detected. The TAA peak position obtained at step S42 is stored.

Then, the one track of information written on the magnetic disk is deleted (step S43).

Then, the actuator is driven to the one side maximum displacement and at this displaced position one track of information is written on the magnetic disk (step S44). More specifically, the drive voltage of DC 15 V is applied to the A channel signal electrode terminal and also the drive voltage of DC 0 V is applied to the B channel signal electrode terminal so as to displace the actuator to the one side maximum displaced position, and one track writing is executed at that state.

Then, the actuator is driven to the other side maximum displacement and at this displaced position one track of information is written on the magnetic disk (step S45). More specifically, the drive voltage of DC 0 V is applied to the A channel signal electrode terminal and also the drive voltage of DC15 V is applied to the B channel signal electrode terminal so as to displace the actuator to the other side maximum displaced position, and one track writing is executed at that state.

Thereafter, a track profile of the HGA using these written tracks is measured by the R/W tester without driving the actuator for displacement (step S46). Thus, a TAA performance with respect to a off-track distance or a distance from the track center, shown in FIG. 17 can be obtained.

The TAA performance with respect to the off-track distance obtained by the track profile measurement at step S46 is stored as a TAA performance.

Thereafter, by comparing thus obtained TAA performance with the stored peak position of TAA, peak shift amounts of the actuator shown in FIG. 17 are calculated to get the one side maximum displacement and the other side maximum displacement of the actuator (step S47). As a result, displacement performance of the actuator such as characteristics of the maximum displacement amount versus drive voltage can be obtained.

As aforementioned, because the displacement performance of the actuator is obtained by utilizing the track profile measurement function of the R/W tester, it is not necessary to introduce a new inspection instrument resulting a manufacturing cost of the HGA to prevent from increasing. Also, because the displacement performance test can be executed simultaneously with the normal test of the electromagnetic conversion performance of the HGA using the RIW tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

Figure 18:
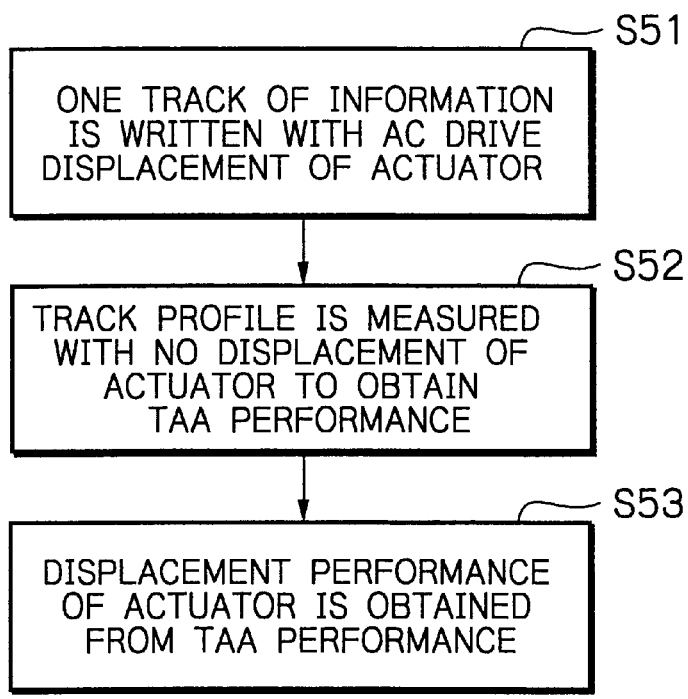
FIG. 18 shows a flow chart of an HGA performance test process in a further embodiment according to the present invention.

FIG. 18 is a flow chart of an HGA performance test process in a further embodiment according to the present invention.

Figure 19:
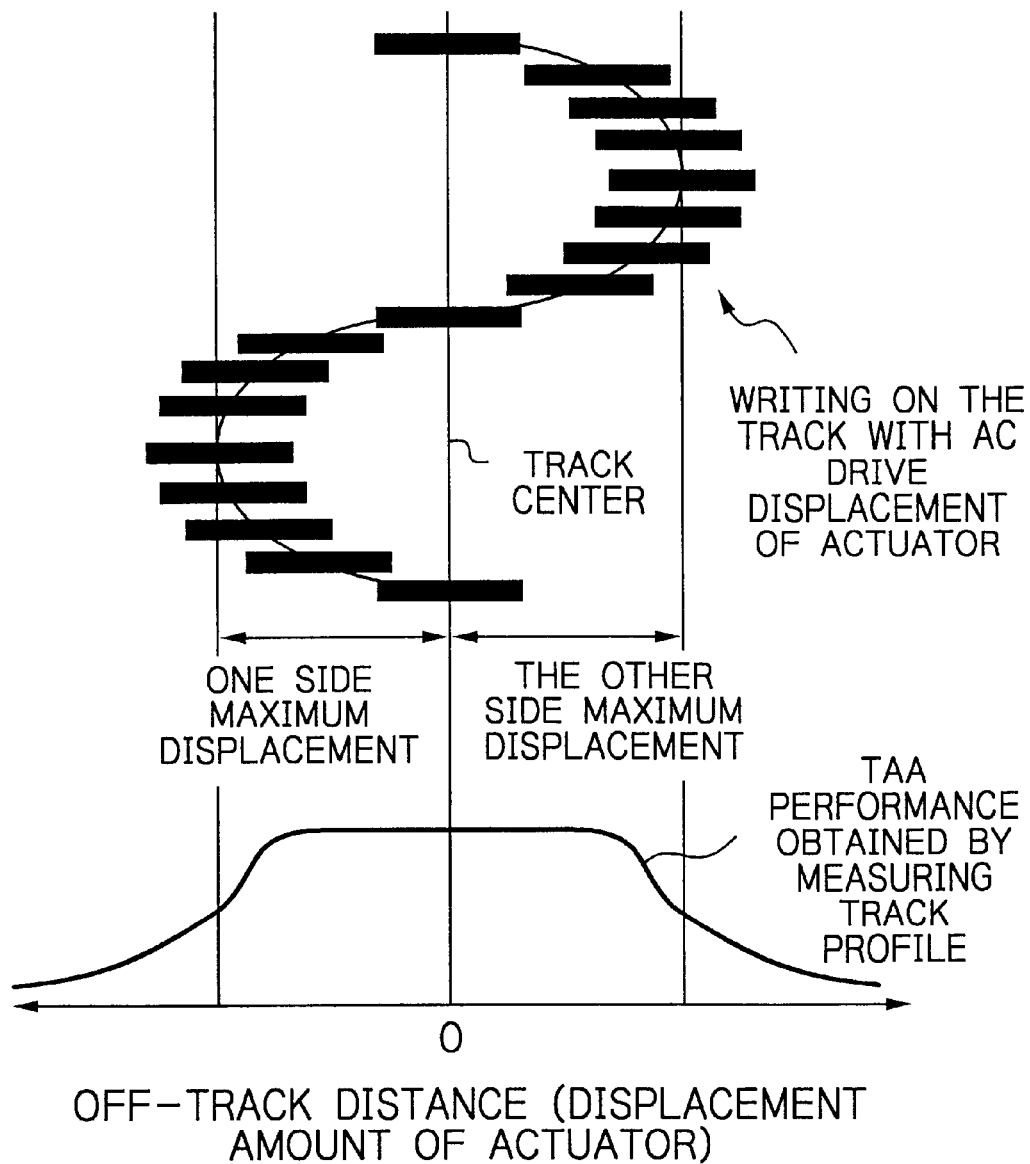
FIG. 19 illustrates a track written on a magnetic disk and a TAA performance obtained by a track profile measurement in the embodiment of FIG. 18.

First, an HGA to be tested is mounted on a R/W tester, and then one track of information is written on a magnetic disk while applying an AC drive signal to the actuator for displacement (step S51). More specifically, one track writing is executed while AC drive signals with an amplitude of 7.5 V, biased by 7.5 V, and a frequency of about 1–10 kHz are applied across the common electrode terminal and the A and B channel signal electrode terminals of the actuator in the opposite phase to displace the actuator between the one side and the other side maximum displacements. FIG. 19 indicates the thus written track on the magnetic disk. A frequency of the AC drive signals is variable.

Then, a track profile of this HGA using the written track is measured by the R/W tester also without driving the actuator for displacement (step S52). More specifically, track profile measurement is executed while a drive signal of DC 7.5 V (bias) is applied to the A and B channel signal electrode terminals of the actuator to locate the actuator at the center that is its initial position. Thus, a TAA performance with respect to a off-track distance or a distance from the track center, shown in FIG. 19 can be obtained.

From the TAA performance with respect to a off-track distance or a distance from the track center obtained by the track profile measurement, the one side maximum displacement and the other side maximum displacement of the actuator are calculated (step S53). As a result, displacement performance of the actuator such as characteristics of the maximum displacement amount versus drive voltage can be obtained.

Figure 20A:
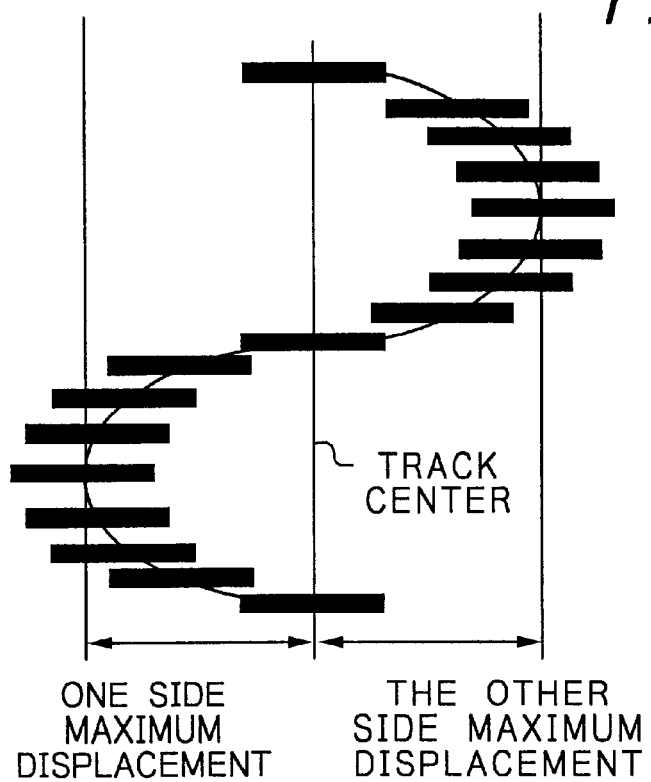
FIG. 20a illustrates a track written on a magnetic disk by an actuator with a large displacement amount in the embodiment of FIG. 18.
Figure 20B:
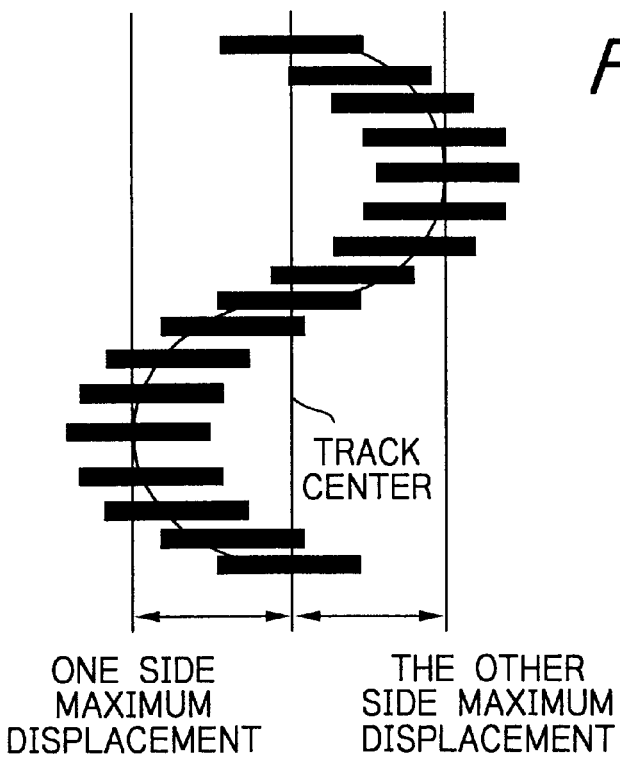
FIG. 20b illustrates a track written on a magnetic disk by an actuator with a small displacement amount in the embodiment of FIG. 18.
Figure 21:
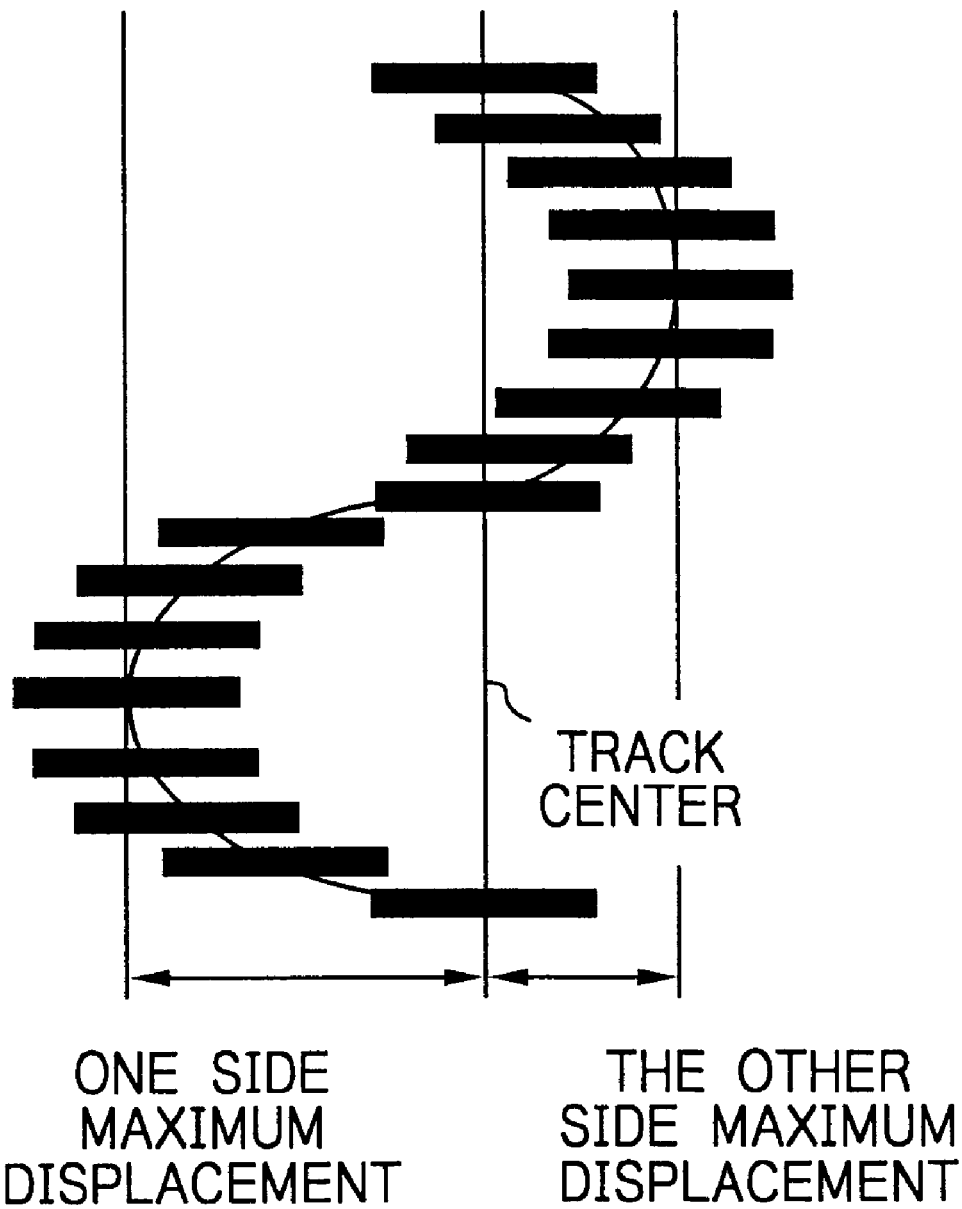
FIG. 21 illustrates a track written on a magnetic disk by an actuator with asymmetric displacement amount in the embodiment of FIG. 18.

According to the embodiment, it is possible to easily detect not only a displacement performance of the actuator such as its displacement amount (stroke) is large as shown in FIG. 20a or its displacement amount (stroke) is small as shown in FIG. 20b, but also a displacement performance of the actuator such as its displacement amount (stroke) is asymmetrical about the track center as shown in FIG. 21.

As aforementioned, because the displacement performance of the actuator is obtained by utilizing the track profile measurement function of the R/W tester, it is not necessary to introduce a new inspection instrument, which would result in an increased a manufacturing cost of the HGA. Also, because the displacement performance test can be executed simultaneously with the normal test of the electromagnetic conversion performance of the HGA using the R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be prevented from increasing.

Particularly, according to this embodiment, the displacement performance of the actuator is measured by applying to the actuator an AC drive signal. Thus, the displacement performance test can be executed under the similar conditions as in the actual operation of the actuator. Therefore, a more precise displacement performance test can be expected.

If the similar test is executed by changing a frequency of the drive signal applied to the actuator, a displacement performance of the actuator under various frequencies can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the step of obtaining a displacement performance of said actuator by driving said actuator to displace, and by executing a track profile measurement of said at least one thin-film magnetic head element, wherein said driving of the actuator includes applying an AC drive signal to said actuator.

2. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the step of obtaining a displacement performance of said actuator by driving said actuator to displace and by executing a track profile measurement of said at least one thin-film magnetic head element, wherein said driving of the actuator is executed only during a reading out operation of said at least one thin-film magnetic head element.

3. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the step of obtaining a displacement performance of said actuator by driving said actuator to displace, and by executing a track profile measurement of said at least one thin-film magnetic head element, wherein said driving of the actuator is executed only during a writing operation of said at least one thin-film magnetic head element.

4. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the steps of:

writing at least one track of information on a magnetic medium with no displacement of said actuator;

executing a track profile measurement of the head gimbal assembly using the written at least one track of information with no displacement of said actuator to obtain a reference track average amplitude profile with respect to an off-track distance;

measuring a track average amplitude at each position displaced by driving said actuator; and obtaining a displacement performance of said actuator from said reference track average amplitude profile and said measured track average amplitudes.

5. The method as claimed in claim 4, wherein said driving of the actuator includes applying a DC drive signal to said actuator.

6. The method as claimed in claim 5, wherein said DC drive signal is a DC voltage signal with a variable voltage.

7. The method as claimed in claim 5, wherein said DC drive signal is DC voltage signals with voltages for driving said actuator to the maximum displacement thereof.

8. The method as claimed in claim 4, wherein said driving of the actuator is executed only during a reading out operation of said at least one thin-film magnetic head element.

9. The method as claimed in claim 4, wherein said writing step comprises a step of writing one track on the magnetic medium.

10. The method as claimed in claim 4, wherein said writing step comprises writing of two tracks on the magnetic medium.

11. The method as claimed in claim 10, wherein said written two tracks are spaced by a distance substantially corresponding to the maximum displacement of said actuator from one side to the other side.

12. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the steps of:

writing at least one track of information on a magnetic medium with no displacement of said actuator;

executing a track profile measurement of the head gimbal assembly using the written at least one track of information with no displacement of said actuator to obtain a reference track average amplitude profile with respect to an off-track distance;

executing a track profile measurement of the head gimbal assembly using the written at least one track of information with displacement of said actuator to obtain a track average amplitude performance with respect to an off-track distance; and obtaining a displacement performance of said actuator from said reference track average amplitude profile and said track average amplitude performance.

13. The method as claimed in claim 12, wherein said executing step with displacement of the actuator comprises executing a track profile measurement of the head gimbal assembly using the written at least one track of information when said actuator is driven to its maximum displacement to one side to obtain a first track average amplitude performance with respect to an off-track distance, and executing a track profile measurement of the head gimbal assembly using the written at least one track of information when said actuator is driven to its maximum displacement to the other side to obtain a second track average amplitude performance with respect to an off-track distance, and wherein said obtaining step comprises obtaining a displacement performance of said actuator from said reference track average amplitude profile and said first and second track average amplitude performances.

14. The method as claimed in claim 13, wherein said driving of the actuator includes applying a DC drive signal to said actuator.

15. The method as claimed in claim 14, wherein said DC drive signal is DC voltage signals with voltages for driving said actuator to the maximum displacement thereof.

16. The method as claimed in claim 13, wherein said driving of the actuator is executed only during a reading out operation of said at least one thin-film magnetic head element.

17. The method as claimed in claim 13, wherein said writing step comprises a step of writing one track on the magnetic medium.

18. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the steps of:

writing at least one track of information on a magnetic medium with no displacement of said actuator;

executing a track profile measurement of the head gimbal assembly using the written at least one track of information with no displacement of said actuator to obtain a reference track average amplitude profile with respect to an off-track distance;

deleting said written at least one track of information;

writing at least one track of information on a magnetic medium with displacement of said actuator;

executing a track profile measurement of the head gimbal assembly using the written at least one track of information with no displacement of said actuator to obtain a track average amplitude performance with respect to an off-track distance; and obtaining a displacement performance of said actuator from said reference track average amplitude profile and said track average amplitude performance.

19. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the steps of:

writing at least one track of information on a magnetic medium with no displacement of said actuator;

executing a track profile measurement of the head gimbal assembly using the written at least one track of information with no displacement of said actuator to obtain a reference track average amplitude profile with respect to an off-track distance;

deleting said written at least one track of information;

writing at least one track of information on a magnetic medium with displacement for driving said actuator to its maximum displacement to one side;

executing a track profile measurement of the head gimbal assembly using the written at least one track of information with no displacement of said actuator to obtain a first track average amplitude performance with respect to an off-track distance;

deleting said written at least one track of information;

writing at least one track of information on a magnetic medium with displacement for driving said actuator to its maximum displacement to the other side;

executing a track profile measurement of the head gimbal assembly using the written at least one track of information with no displacement of said actuator to obtain a second track average amplitude performance with respect to an off-track distance; and obtaining a displacement performance of said actuator from said reference track average amplitude profile and said first and second track average amplitude performances.

20. The method as claimed in claim 19, wherein said driving of the actuator includes applying a DC drive signal to said actuator.

21. The method as claimed in claim 20, wherein said DC drive signal is DC voltage signals with voltages for driving said actuator to the maximum displacement thereof.

22. The method as claimed in claim 19, wherein said driving of the actuator is executed only during a writing operation of said at least one thin-film magnetic head element.

23. The method as claimed in claim 19, wherein said writing step comprises a step of writing one track on the magnetic medium.

24. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the steps of:

writing at least one track of information on a magnetic medium with no displacement of said actuator;

measuring a peak position of track average amplitude from said at least one thin-film magnetic head element using the written at least one track of information with no displacement of said actuator;

deleting said written at least one track of information;

writing at least one track of information on a magnetic medium with displacement for driving said actuator to its maximum displacement to one side;

writing at least one track of information on a magnetic medium with displacement for driving said actuator to its maximum displacement to the other side;

executing a track profile measurement of the head gimbal assembly using the written tracks of information with no displacement of said actuator to obtain a track average amplitude performance with respect to an off-track distance; and obtaining a displacement performance of said actuator from said peak position and said track average amplitude performance.

25. The method as claimed in claim 24, wherein said driving of the actuator includes applying a DC drive signal to said actuator.

26. The method as claimed in claim 25, wherein said DC drive signal is DC voltage signals with voltages for driving said actuator to the maximum displacement thereof.

27. The method as claimed in claim 24, wherein said driving of the actuator is executed only during a writing operation of said at least one thin-film magnetic head element.

28. The method as claimed in claim 24, wherein said writing step comprises a step of writing one track on the magnetic medium.

29. The method as claimed in claim 24, wherein said writing step comprises writing of two tracks on the magnetic medium.

30. The method as claimed in claim 29, wherein said written two tracks are spaced by a distance substantially corresponding to the maximum displacement of said actuator from one side to the other side.

31. A method of testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising the steps of:

writing at least one track of information on a magnetic medium with AC drive displacement of said actuator;

executing a track profile measurement of the head gimbal assembly using the written at least one track of information with no displacement of said actuator to obtain a track average amplitude performance with respect to an off-track distance; and obtaining a displacement performance of said actuator from said track average amplitude performance.

32. The method as claimed in claim 31, wherein said driving of the actuator is executed only during a writing operation of said at least one thin-film magnetic head element.

33. The method as claimed in claim 31, wherein said writing step comprises a step of writing one track on the magnetic medium.

34. The method as claimed in claim 31, wherein a frequency of the AC drive displacement of said actuator is variable.

* * * * *